United States Patent [19]

Yang

[11] 4,390,485
[45] Jun. 28, 1983

[54] METHOD OF INJECTION MOLDING A FOAMED RESIN PRODUCT HAVING A SMOOTH SURFACE INVOLVING SURFACE HEATING OF THE MOLD BY APPLYING HIGH CURRENT LOW VOLTAGE ELECTRIC POWER

[76] Inventor: Wen-Jei Yang, 3925 Waldenwood, Ann Arbor, Mich. 48104

[21] Appl. No.: 337,852

[22] Filed: Jan. 7, 1982

[51] Int. Cl.³ .................... B29D 27/00; B29F 1/022
[52] U.S. Cl. .................................. 264/25; 249/78; 264/45.5; 264/328.16; 264/DIG. 83; 425/548; 425/552; 425/817 R
[58] Field of Search ............... 264/25, DIG. 83, 45.5, 264/328.16; 249/78; 425/710, 548, 552, 817 R

[56] References Cited

U.S. PATENT DOCUMENTS

| Re. 22,899 | 7/1947 | Tucker ........................... 264/25 X |
|---|---|---|
| 2,182,389 | 12/1939 | Reid ........................... 264/328.16 X |
| 2,317,597 | 4/1943 | Ford et al. .................... 425/110 X |
| 2,360,023 | 10/1944 | Tucker ............................... 249/78 |
| 2,834,992 | 5/1958 | Jupa ........................... 264/328.16 X |
| 2,912,418 | 11/1959 | Johnson et al. ..................... 264/236 |
| 2,979,773 | 4/1961 | Bolstad ................................. 249/78 |
| 2,984,887 | 5/1961 | Thiess . |
| 3,173,175 | 3/1965 | Lemelson ........................ 249/78 X |
| 3,185,432 | 5/1965 | Hager, Jr. ............................ 249/78 |
| 3,671,168 | 6/1972 | Nussbaum ................. 264/DIG. 83 |
| 3,763,293 | 10/1973 | Nussbaum ........................ 264/25 X |
| 4,201,742 | 5/1980 | Hendry .............................. 264/45.5 |
| 4,338,068 | 7/1982 | Suh et al. ........................ 249/78 X |

FOREIGN PATENT DOCUMENTS

| 210323 | 7/1960 | Austria ................................. 264/25 |
|---|---|---|
| 2050733 | 4/1972 | Fed. Rep. of Germany ........ 249/78 |
| 48-33630 | 10/1973 | Japan .................................. 264/45.5 |

*Primary Examiner*—Philip E. Anderson
*Attorney, Agent, or Firm*—James M. Deimen

[57] ABSTRACT

The invention comprises a method to quickly heat a mold cavity surface or portions thereof just prior to the injection of a foamable plastic resin. The apparatus comprises one or more thin metal surface sheets or bands of high electrical resistivity in the mold cavity covering those portions of the mold where a smooth surface finish on the product is desired. In an alternative form the surface sheets may be plated or sprayed metal of high resistivity on a layer of thin electrically non-conducting plastic in turn adhered to the mold cavity surface.

The thin metal surface sheet is resistance heated approximately 300° F. in a few seconds or less by a low voltage high current source of electric power just prior to the injection of the foamable plastic. The high current passing through the metal of high resistivity causes conversion of electrical energy into sensible heat very quickly to accomplish quick heating of the mold cavity surface sheet. The low voltage eliminates the need for substantial electrical insulation between the thin metal surface sheet and the bulk metal of the mold. Where steel molds and steel surface sheets are employed, the normal oxide coating on the steel serves as the insulation at the interface of the surface sheet and the mold.

To reduce or minimize arcing in the electrical switch gear employed to momentarily connect the high current low voltage source to the surface sheet, a water cooled electric heating pipe bypass is employed as an electrical energy sink during the portion of the molding process that does not employ heating of the surface sheet.

6 Claims, 2 Drawing Figures

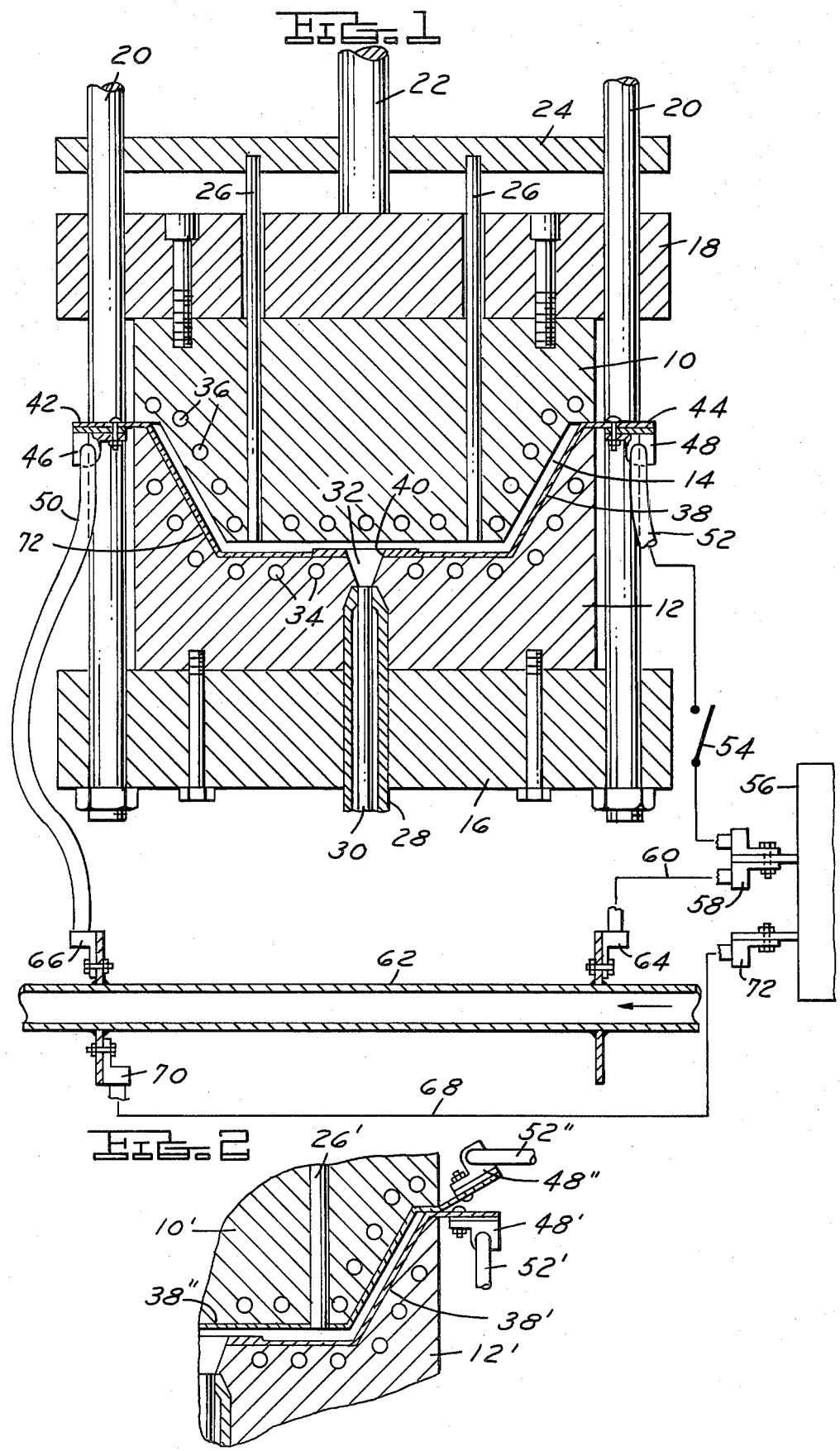

METHOD OF INJECTION MOLDING A FOAMED RESIN PRODUCT HAVING A SMOOTH SURFACE INVOLVING SURFACE HEATING OF THE MOLD BY APPLYING HIGH CURRENT LOW VOLTAGE ELECTRIC POWER

BACKGROUND OF THE INVENTION

The field of the invention pertains to injection molding of foamable plastic products and, in particular, to the provision of a smooth surface finish on the foamed plastic products.

For aesthetic and functional reasons a smooth, shiny and blemish free surface finish is desired on many foamed plastic products. Such a smooth and blemish free surface finish can be provided by molding with dies heated to a relatively high temperature (300° F.–550° F.) prior to injecting the foamable plastic into the die cavity. The upper temperature is typically selected to be above the heat distortion temperature of the foamable plastic. The dies must then be cooled to approximately 140° F. before the mold is opened and the product ejected. The repeated heating and cooling of the relatively massive bulk of the mold requires considerable time and energy.

In order to substantially lessen the cycle time necessary to heat and cool the mold, means for heating only the cavity surface just prior to injection of the foamable plastic have been developed. Exemplifying this approach in the prior art is U.S. Pat. No. 4,201,742. Disclosed is a method for heating the mold cavity surface by means of condensing steam thereon and draining the condensate from the cavity just prior to injection of the foamable plastic resin. This method provides a smooth surface finish on the product as desired, however, despite much effort to overcome water marks and streaks caused by condensate near the bottom of the mold cavity, such defects continue to be a problem.

A method and apparatus for dry heating the cavity surface is shown in U.S. Pat. No. 2,979,773 wherein a semiconductive film is coated on the mold surface and an aluminum electrode plated onto the semiconductive film. The mold body constitutes the other electrode. A heating current passes through the entire mold with the greatest temperature rise occurring in the semiconductive film. Such a construction is limited to relatively short production runs because the aluminum and semiconductive film coatings are subject to rapid wear with repeated molding cycles.

U.S. Pat. No. 3,173,175 discloses a thin metal resistance element on or embedded in a glass or ceramic insulative layer. Glass and ceramic coatings, however, severely limit the mold steels that can be used to support the glass and ceramic coatings and are very difficult to apply only to those areas of the mold surface to be heated.

U.S. Pat. No. 2,984,887 discloses an electrically heated copper or silver coating or preformed cup inserted in a ceramic mold. The mold is heated for a time sufficient to dry the skin on ceramic green ware such that the green ware shrinks away from the mold and can be removed easily without damage. The cup or liner is porous or only covers part of the mold cavity surface to permit the absorbtion of vapors from the drying ceramic mix. The temperatures are limited and the heating time on the order of a half a minute to drive out the moisture without damage to the part.

SUMMARY OF THE INVENTION

The invention comprises a method and apparatus to quickly heat an injection mold surface or portions thereof just prior to the injection of a foamable plastic resin or molding compound. The apparatus comprises one or more thin metal surface sheets or bands in the mold cavity covering those portions of the mold where a smooth surface finish on the product is desired. In an alternate form the electrically heated surface sheet may be plated or sprayed (sputtered) metal of a high resistivity on a layer of thin electrically nonconducting plastic in turn adhered to the mold cavity surface. A suitable plastic for the non-conducting layer may be selected from the polyimide group.

The thin metal surface sheet is resistance heated about 300° F. in a few seconds or less by a low voltage high current source of electric power just prior to injection of the foamable plastic. The high current passing through the metal of high resistivity causes conversion of electrical energy into sensible heat very quickly to accomplish quick heating of the mold cavity surface sheet. The low voltage eliminates the need for substantial electrical insulation between the thin metal surface sheet and the bulk metal of the mold or die. Where steel molds and steel surface sheets are employed, the normal oxide coating on the steel serves as the electrical insulation at the interface of the surface sheet and the mold.

The thin adhesive layer of plastic in the alternate form acts as an electrical insulator also without substantially reducing the heat transfer through the layer during the cooling cycle of the molding process. A second advantage to the oxide layer or thin adhesive layer is the elimination of damage and wear due to the repeated cycling pressures and temperatures. Crushing of the insulative layer is essentially eliminated. The metal surface sheet is typically steel two millimeters or less in thickness backed by the bulk steel mold. The sturdy construction thereby results in a more serviceable and longer lived mold cavity construction than the prior art.

To reduce or minimize arcing in the electrical switch gear employed to momentarily connect the high current low voltage source of electric power to the surface sheet, a water cooled electric heating pipe bypass is employed as an electrical energy sink during the portion of the molding cycle that does not employ heating of the surface sheet.

DESCRIPTION OF THE DRAWINGS

FIG. 1 is a cross section of a mold modified in accordance with the invention; and, FIG. 2 is a partial cross section of the mold of FIG. 1 with a second modification according to the invention.

DESCRIPTION OF THE PREFERRED EMBODIMENTS

In FIG. 1 the cross section of a mold in closed position is shown including male 10 and female 12 mold halves enclosing a mold cavity 14. The female mold half 12 is attached to a fixed plate 16 and the male mold half 10 attached to a traveling plate 18. The fixed plate 16 and traveling plate 18 are aligned by spaced guide bars 20 and the traveling plate 18 moved by the actuator 22. Also movable on the guide bars 20 is an ejector plate 24 and a plurality of ejector pins 26 for detaching the plastic molded product from the male mold half 10 upon completion of the molding cycle.

Extending into the female mold half 12 are an injection nozzle 28 and shut off pin 30. The nozzle 28 communicates with a sprue 32 in turn in communication with the mold cavity 14. The holes 34 and 36 indicate a plurality of cooling fluid passages formed in the male and female mold halves for carrying cooling fluid during the molding process. The remaining elements of an injection molding machine are well known in the art and the method and apparatus for mechanically actuating the mold and injecting the foamable plastic resin is not shown or described in detail.

Forming the inside surface of the mold cavity 14 is a thin metallic sheet 38 conforming to the shape of the female mold half 12. The thin metallic sheet 38 includes an aperture 40 to allow communication between the sprue 32 and the mold cavity 14. The metallic sheet 38 extends outside the mold on opposite sides as indicated at 42 and 44 where electrical cable attachments 46 and 48 are attached to the sheet 38. Low voltage high current electric cables 50 and 52 are fastened to the cable attachments 46 and 48 respectively.

Electric cable 52 is connected through a switch 54 to a low voltage high current source of electric power 56. The cable clamp 58 attaching cable 52 to the power source 56 also attaches a third electric cable 60 thereto. A metallic heating pipe 62 is electrically connected at 64 to cable 60. Electric cable 50 is attached at 66 to the heating pipe 62 at a location spaced from the attachment at 64. A fourth electric cable 68 is attached to the heating pipe 62 at 70 substantially adjacent attachment 66 and extends to a cable clamp 72 providing electrical connection with the low voltage high current source 56. The attachments 66 and 70 may be a common attachment to the heating pipe 62. During operation of the injection molding machine according to the process described below a cooling fluid is passed through the heating pipe 62.

A modification of the apparatus is illustrated in FIG. 2 wherein both the female 12' and male 10' mold halves are covered with thin metallic sheets 38' and 38" respectively. The ends of the ejector pins 26' extend through the sheet 38" as shown. To enable the mold to be opened and closed, separate cable attachments 48' and 48" and separate cables 52' and 52" are attached to the sheets 38' and 38" respectively. A similar arrangement is provided on the opposite side of the mold for cable 50.

The metallic sheet is preferably made of low carbon steel, silicon steel or stainless steel to provide a relatively high resistance to the flow of electric current. The voltage is typically limited to less than 50, however, the current can range up to and if required, exceed 2000 amperes. By limiting the voltage, the natural oxide coating on the metallic sheet 38 and the underlying steel mold 12 acts as an adequate electrical insulator at the interface contact 72 between the mold 12 surface and the sheet 38. Alternatively, a thin adhesive layer may be applied between the mold 12 and the sheet 38 to act as both an electrical insulator and means to secure the sheet to the mold surface. Such an adhesive layer is formed as thin as possible to minimize the resistance to heat transfer during the cooling portion of the molding cycle.

In another alternative construction, the metallic sheet may be formed by plating or spraying (sputtering) a metal of high resistivity onto a layer of thin electrically non-conducting plastic in turn adhered to the mold 12 surface.

Typically foamed plastic molding compounds require that the surface of the mold cavity be in excess of the heat distortion temperature of the plastic to obtain a Class A smooth surface finish. Such a temperature is between 350° F. and 550° F. for most common foamable polymers. By utilizing a metallic sheet 38 of substantially 2 millimeters thickness, the surface temperature of the sheet can be raised 300° F. in a fraction of a second. Thus, the mold surface temperature subsequent to the ejection of the previous part, about 140° F., can be raised above the heat distortion temperature in a fraction of a second after the mold is reclosed just prior to injection of the plastic molding compound. The time required to reheat the mold surface is therefore a small fraction of the cycle time for the part and the bulk material of the mold halves 10 and 12 is not substantially reheated and recooled with each part cycle. The actual heating time for a particular part will depend upon the size of the part, the required temperature increase and the amperage applied to the metallic sheet.

Because a very high current load is applied for a short period of time during each cycle and then disconnected by switch 54, a bypass load in the form of heating pipe 62 is provided to minimize arcing in the switch and current surges applied to the current source 56. The electrical resistance of the pipe 62 is high relative to the resistance of the sheet 38, thus closure of the switch 54 effectively creates a short circuit path through the sheet 38. The bulk of the current from source 56 passes through the sheet 38 with the switch 54 closed. Because of the electrically insulating layer of oxide between the sheet 38 and the mold half 12, the bulk of the electric current passes through the sheet in preference to the mold half 12 despite use of steel for both the mold half and the sheet.

A suitable source of electric power 56 can be a continuous duty arc welder supply or an alternating or direct current continuous duty motor generator set. The capacity of the power source and the amperage capacity of the switch 54 will be determined by the volume of the metallic sheet 38 and the temperature increase required. The switch 54 is closed and opened by the machine control circuitry.

The adhesive plastic layer in the alternative form of the invention may be a polyimide or other plastic suitable for high temperatures (600° F.) and repeated cyclic heating.

The surface heating method is very quick and therefore imposes a negligible time penalty on the product molding cycle time. The electric energy utilized to heat the bypass pipe 62 may be recycled as hot water to maintain the mold temperature or to preheat the foamable plastic resin prior to injection.

Where the particular product shape requires a mold cavity surface with relatively small radii of curvature or sharp corners, localized overheating of the metallic sheet or heater band can occur. To prevent such localized overheating, the thickness or cross section of the sheet is adjusted by locally thickening the sheet. Thickening can be accomplished effectively by spraying or plating on additional metal at the localized areas.

As an example of the process and apparatus, a heater band or metallic sheet is constructed with the following dimensions and property:

| | |
|---|---|
| Length = | 30 cm |
| Width = | 10 cm |

-continued

| | |
|---|---|
| Thickness = | 0.2 cm |
| Resistivity = | 30 micro-ohm-centimeters @ 20° C. |

For a temperature increase of 200° C. or 392° F., the following times are typically required with the following amperages:

| | | |
|---|---|---|
| 1000 | amp. requires | 0.09 sec. |
| 500 | amp. requires | 0.37 sec. |
| 100 | amp. requires | 0.90 sec. |

Thus, the mold cavity surface can be heated very quickly above the heat distortion temperature of the resin just before or as the injection of foamable resin begins. The bulk of the surface sheet is minimal in comparison with the bulk of the mold halves, thus the newly formed foamed plastic product can be cooled quickly below the heat distortion temperature. Very little mass is heated and cooled cyclically in the process. The heating time is so short as to not appreciably lengthen the cycle time for the entire molding process cycle. The layer of oxide or thin adhesive plastic between the metallic sheet and the bulk of the mold minimizes resistance to heat transfer during the cooling portion of the process cycle.

I claim:

1. A process for quickly manufacturing injection molded foamed resin products with a smooth surface finish comprising the steps of:
   closing the injection mold,
   applying high current low voltage electric power to a heater band on the surface of the mold cavity to substantially increase the mold surface temperature within a matter of seconds or less in those portions of the mold cavity covered by the heater band,
   disconnecting the high current low voltage electric power from the heater band,
   injecting a molten foamable resin into the mold cavity, the foamable resin thereupon expanding against the hot heater band,
   reducing the temperature of the resin in the mold cavity below the heat distortion temperature of the resin by cooling the mold and heater band, and,
   opening the injection mold and removing the plastic product.
2. The process of claim 1 wherein the heater band temperature is rasied from approximately 150° F. to a maximum of 600° F.
3. The process of claim 1 wherein the current applied to the heater band ranges from 100 to 3000 amperes.
4. The process of claim 1 wherein the voltage applied to the heater band is limited to less than 50 volts and the current exceeds 100 amperes.
5. The process of claim 1 wherein at least a portion of the resin is injected prior to disconnecting the electric power to the heater band.
6. The process of claim 1 wherein the heater band is supplied with electric power for less than five seconds per molding cycle.

* * * * *